United States Patent
Hoblit

(10) Patent No.: US 8,386,347 B2
(45) Date of Patent: Feb. 26, 2013

(54) SYSTEM AND METHOD FOR TRACKING THE RETURN OF LOANED OR RENTED ITEMS

(75) Inventor: Robert S. Hoblit, Knightdale, NC (US)

(73) Assignee: Toshiba TEC Corporation, Tokyo (JP)

( * ) Notice: Subject to any disclaimer, the term of this patent is extended or adjusted under 35 U.S.C. 154(b) by 2303 days.

(21) Appl. No.: 10/880,050

(22) Filed: Jun. 29, 2004

(65) Prior Publication Data

US 2005/0289032 A1 Dec. 29, 2005

(51) Int. Cl.
*G06Q 40/00* (2006.01)

(52) U.S. Cl. .............................. 705/35; 705/22; 705/37

(58) Field of Classification Search ............... 705/37, 705/22, 25, 26, 35
See application file for complete search history.

(56) References Cited

U.S. PATENT DOCUMENTS

| | | | |
|---|---|---|---|
| 4,458,802 A | 7/1984 | Maciver et al. | |
| 4,598,810 A | 7/1986 | Shore et al. | |
| 4,735,290 A | 4/1988 | Byrley | |
| 4,839,505 A | 6/1989 | Bradt et al. | |
| 4,884,212 A | 11/1989 | Stutsman | |
| 4,967,906 A | 11/1990 | Morello et al. | |
| 5,028,766 A | 7/1991 | Shah | |
| 5,139,384 A | 8/1992 | Tuttobene | |
| 5,777,884 A * | 7/1998 | Belka et al. | 700/225 |
| 6,201,474 B1 | 3/2001 | Brady et al. | |
| 6,438,447 B1 | 8/2002 | Belka et al. | |
| 2002/0062274 A1* | 5/2002 | Tamayama et al. | 705/37 |
| 2002/0082917 A1 | 6/2002 | Takano | |

FOREIGN PATENT DOCUMENTS

| | | |
|---|---|---|
| EP | 1220544 A1 | 3/2002 |
| WO | WO98/03944 | 1/1998 |

* cited by examiner

*Primary Examiner* — Ojo O Oyebisi
(74) *Attorney, Agent, or Firm* — Ronald V. Davidge

(57) ABSTRACT

A system for tracking a number of items borrowed or rented by customers includes a chute reading identification data from each item as the item is returned through the chute by the customer. Data records associated with the returned items are updated to indicate the items are available, even before the items can be restocked. The time at which an item is returned may be compared with a time at which it is due, with an additional fee being added to an account of a customer borrowing or renting an item that is returned late.

22 Claims, 9 Drawing Sheets

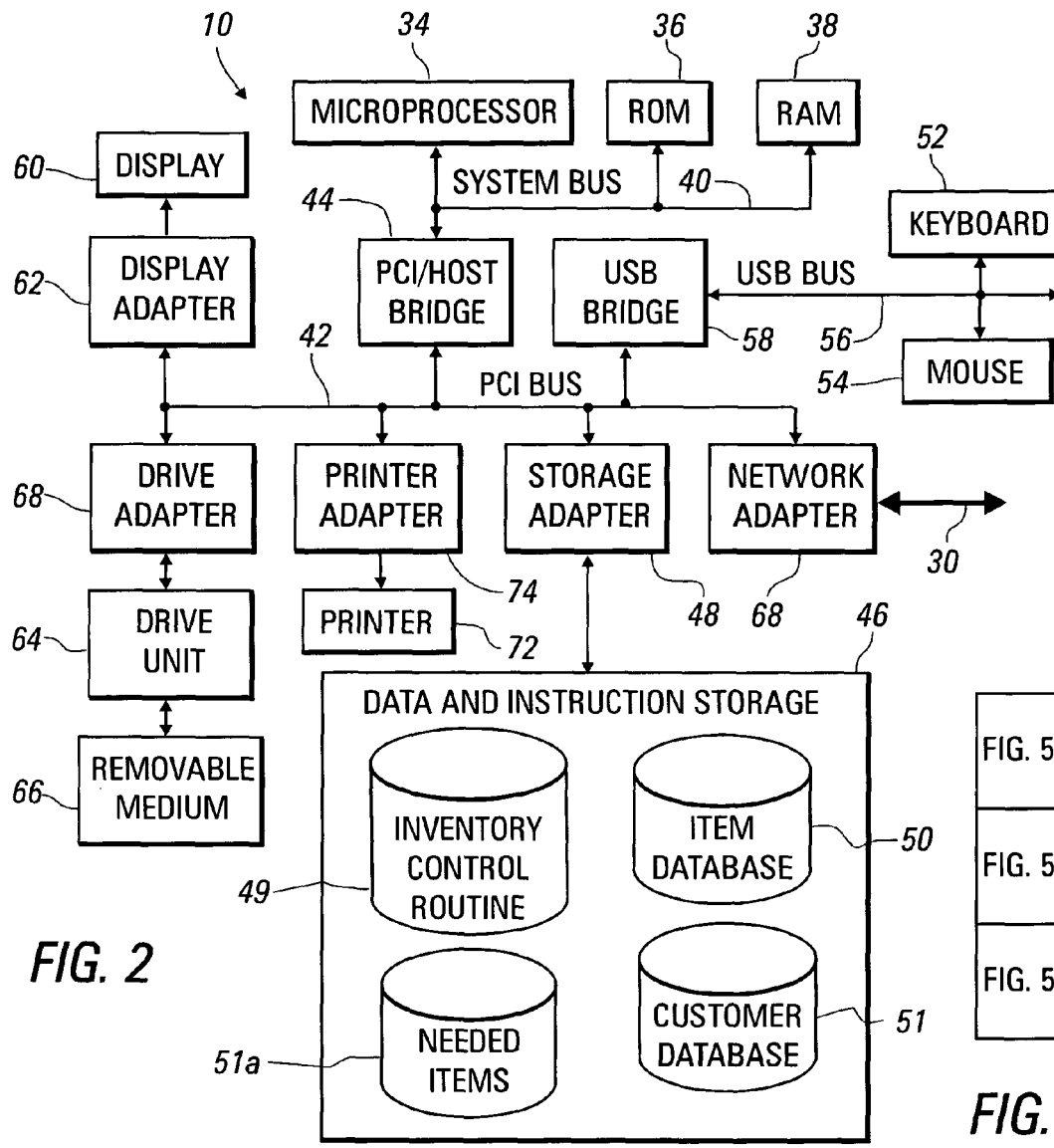
FIG. 2
FIG. 5
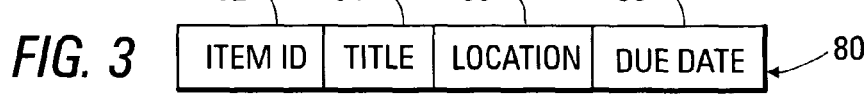
FIG. 3
FIG. 4

SYSTEM AND METHOD FOR TRACKING THE RETURN OF LOANED OR RENTED ITEMS

BACKGROUND OF THE INVENTION

1. Field of the Invention

This invention relates to the control of an inventory of items to be loaned or rented, and, more particularly, to updating inventory and customer records while monitoring the process of returning loaned or rented items, such as video recordings or library books, for which additional fees are due when the items are returned late.

2. Summary of the Background Art

A typical video rental store includes a display area in which video tapes and disks are displayed for rental, a number of transaction terminals, and two chutes through which rented video recordings are returned, with an outside chutes being arranged to provide for the introduction of video recordings from the outside, and with the indoor chute being arranged to provide for the introduction of video recordings from inside the store. The outdoor chute provides a convenient way for customers to return video recordings at times when the store is closed and may additionally be used by customers hurrying to return items without becoming involved in the customer traffic within the store.

This type of store typically receives payments for rented video recordings at the transaction terminals before the recordings leave the store, being rented for a previously established time. When a recording is rented, the identity of the customer is also established, with a determination being made that the customer has an account with the store, or alternatively with the establishment of a new account for a customer not previously having an account. If a recording is returned later than the time at which the recording is due back, a penalty is charged against the account of the customer. Often, this penalty is not charged until the customer returns to the store to rent another video. Otherwise, the customer may be contacted by mail or telephone regarding the payment, or a charge may be placed against a credit card account specified for that purpose.

One problem with this method arises from the fact that the time at which the customer deposits the video recording within a chute is not recorded. The determination of whether a penalty is owed, and the amount of the penalty, is supposed to be based on whether the recording is returned before a predetermined time of day, which may occur when the store is open or closed. Thus, if the process of charging penalties is to be accurate, it is incumbent upon employees of the store that recordings that have been returned before the predetermined time of day must be segregated from subsequently returned recordings soon after the predetermined time of day is reached. While this is a particular problem if this time of day occurs when the store is closed, it can also be a problem if the time of day occurs when the store is open, but when its employees are busy. Thus, what is needed is a method for monitoring the time at which individual recordings are returned without requiring the employee attention to the return process.

Another problem with this method arises from the fact that, before employees are able to return recording deposited through the chutes to inventory, there is no record of which recordings have been returned. Thus, such recordings are not readily available for rental. Often, a recording of a recently released movie is so much in demand that employees have to search a pile of returned video recordings to determine whether a recording of the movie has been returned so that it can be rented again without delay. Thus, what is needed is a system providing timely information on which recordings have been returned without being restocked inventory.

The patent literature describes a number of examples of stand-alone vending machines providing for the rental and return of video recordings by a customer without a need for employee assistance or intervention during the rental and return processes. For example, U.S. Pat. No. 4,839,505 describes a machine in which a plurality of videocassettes or other such products are stored in discrete, identifiable locations. A customer identification device receives information about the customer. A mode selection device enables the customer to select among a vend mode, a rent mode, and a return mode, and a videocassette selection device enables the customer to select a desired videocassette to be vended or rented. In the return mode, a videocassette identification device receives information representative of the identity of the videocassette and its travel case being returned. A videocassette is accepted for return only when its travel case has been identified as having originated from the particular machine, with a videocassette transport device then transporting the identified videocassette to the first closest available empty discrete location in the storage device of the machine. If the videocassette is not identified, it is placed with its travel case in a storage area within the machine to prevent further re-rental. A memory device stores information about the customer, the selected mode, the selected videocassette, and the coordinates of videocassettes and available discrete locations in the storage device.

Another example of a vending machine providing video recordings is a vending unit, as described in U.S. Pat. No. 4,598,810, including a number of cubicles, each holding a TV film, dispensed in response to the manipulation by an identified patron.

U.S. Pat. No. 4,458,802 describes a method of renting an article, such as a video cassette or film, to a patron by presenting a hire token to a renting machine for recognition, which starts an article selection circuit to run until it is stopped by the patron when a desired article registers with a delivery receptacle. The machine records the code of the hire token and holds the hire token captive until it is released upon return of the rented article. A foreign article, not coming from the renting machine, is recognized as such and not accepted. The machine may be adapted to operate in a cash renting mode, accepting payment tokens, or in a credit renting mode, debiting the patron's account.

U.S. Pat. No. 6,201,474 describes an automated system for renting or loaning media, such as videos, games, and music, recorded on magnetic storage media including a cassette housing having one or more spools for holding a length of magnetic tape and an integral radio frequency identification (RFID) transponder.

U.S. Pat. No. 5,139,384 describes a vending machine operable by users having identification cards bearing user-identifying codes, with the machine vending and receiving articles, such as videocassettes, having article-identifying codes. The machine includes a single common code reader, such as an optical scanner, for reading both user-identifying codes and article-identifying codes.

U.S. Pat. No. 4,967,906 describes a vending machine for renting and/or selling articles such as videocassettes or audio tapes that are each identifiable by its own code, with the machine including an apparatus, for dispensing and returning the articles, including a pair of opposing stationary arrays of locations, with each location being capable of holding an article and having its own location code.

U.S. Pat. No. 5,028,766 describes an unattended automated rental system for articles such as videocassettes, including a storage unit with electronically locked bins containing rental articles. Each bit and its article have an identification code strip. A customer terminal having a keyboard and a display monitor controlled from a computer permits a customer to review available articles, to reserve articles, and to select articles for rental, causing a control module operated by the computer to unlock a selected bin. An article returned to a bin is checked by the control module for its code strip, with the bin then being locked if the strip is correct. The customer terminal checks customer identification and receives payments.

U.S. Pat. App. Pub. No. 2002/0082917 A1 describes a system including a kiosk returning terminal in which management information from a returned card including a recording medium is transmitted to an electronic content programs distributing server, which determines whether the card contains a rented content program. If it does, the server obtains information including the user name, rented program title, and the like for the card, calculates a usage period, and transmits the result to the kiosk returning terminal, enabling payment of an additional fee at the terminal.

While the patent documents to which reference is made above each provide for recognizing a code identifying a returned rented article, what is needed is a method for recognizing such a code as an article, such as a video recording, is returned through a deposit chute, and for providing a description of the article, together with the time at which it was returned to personnel within a video rental store. Preferably, such information can be collected and provided without requiring any additional actions on the part of the customer returning the article.

Other patent documents describe the use of membership cards in a rental process. For example, International Application No. WO98/03944 describes a store system through which a video cassette tape is rented from a video renting machine by using a membership card having an integrated circuit on which information describing the rental status of the tape and the payment status of the rental is stored. U.S. Pat. No. 4,884,212 describes a dispensing machine that is accessed repeatedly by a card issued by the machine. Again, what is needed is a system providing rental store employees information concerning the identity of returned items and the time of their return.

U.S. Pat. No. 5,777,884 describes an article inventory tracking and control system that tracks and controls the removal of articles from a secured facility, such as a library, rental store, or retail store. Each article is marked with an EAS (electronic article surveillance) marker to prevent its unauthorized removal. Each user of the facility and each article in the facility are uniquely identifiable. Upon receiving the user and article information, a system queries a central database to ensure that the user is a valid user and that the desired transaction is authorized. The article is placed in a special compartment for a particular type of article so that the EAS marker can be properly desensitized. Again, what is needed is a system helping store employees track returned items.

U.S. Pat. No. 4,735,290 describes a multiple-compartment display rack to be provided in an area accessible to browsing customers. Each cell in the display rack removably receives an open-ended transparent plastic envelope containing a display card, preferably printed with photographics, artwork and verbal indicia unique to a particular valuable article or service that is potentially available. Filed in series with each of the display cards is a number of token cards, each bearing an instruction such as "TAKE CARD TO REGISTER" and each representing a unit of the product or service, and a single card bearing a legend such as "SORRY I'M RENTED." At the check-out register, one of the token cards is exchanged for an actual boxed pre-recorded video cassette or other particular article or service. The token card may then be placed in an inaccessible-to-customers supply area for inventory control purposes, until the rented article is returned, a restocking inventory is taken, or the like. What is needed is a system providing for the return of articles without requiring a concurrent action by a store employee.

SUMMARY OF THE INVENTION

According to one aspect of the invention, a method is provided for tracking a number of items as some of the items are loaned to customers. The method includes maintaining an item database including an item data record corresponding to each item in the number of items. A loaned item code is stored in the item data record corresponding to an item as the item is loaned to a customer. The item is later identified as it is returned through an item return chute, and, in response to identifying the item, a recognized item code is stored in the item data record corresponding to the item. Then, a stock location code is stored in the item data record corresponding to the item when the items is returned to a stock location.

According to another aspect of the invention, a system is provided for tracking a number of items as items within the number of items are loaned to customers. The system includes data storage, an item return chute, a user interface, and processor means. The data storage stores a first database including an item data record corresponding to each item in the number of items loaned to customers. The item return chute generates a returned item identifying code when an item in the plurality of items is returned through the item return chute. The user interface includes a display and a selection device, such as a keyboard and mouse. The processor means is programmed to receive the returned item identifying code, and, in response to receiving this code, updating an item data record having an item identification code corresponding to the returned item identifying code to include a recognized item code indicating the item has been recognized. The processor means is additionally programmed to display a set of menu entries on the display, to receive a menu selection signal for changing an item location from the selection device, and, in response to receiving this signal, to display a list of items corresponding to data records including the recognized item code on the display. The processor means is further programmed to receive an item selection signal from the selection device indicating a choice of a selected item from the list of items, and, in response to receiving this signal, to update a data record stored in the data storage to indicate the slelected item has been moved to a stock location.

A system of this kind may include a computer having a single processor, with connections made to peripheral devices through cables, or a number of computer systems interconnected by a network. Thus "processor means" is intended to describe a single processor or several processors acting together under program control.

The consideration of whether an item has been loaned or rented is not significant relative to the operation of the invention. Whether an item has been loaned or rented, it is desirable to have a means for tracking the item when it is in the customer's possession, when it has been returned by the customer but not yet restocked by an employee of a store, and after it has been restocked. Both stores renting items, such as video recordings, and libraries loaning books generally have policies of assigning additional fees when the items are returned late. For this reason, phrases including words derived from "borrow" or "loan" are understood to apply to an item rental process as well as to an item borrowing process.

BRIEF DESCRIPTION OF THE DRAWINGS

FIG. 2 is a block diagram of a computer system within the store system of FIG. 1;

FIG. 3 is a schematic view of a data record within an item database stored in the computer system of FIG. 2;

FIG. 4 is a schematic view of a data record within a customer database stored in the computer system of FIG. 2;

DETAILED DESCRIPTION OF THE INVENTION

Figure 1:
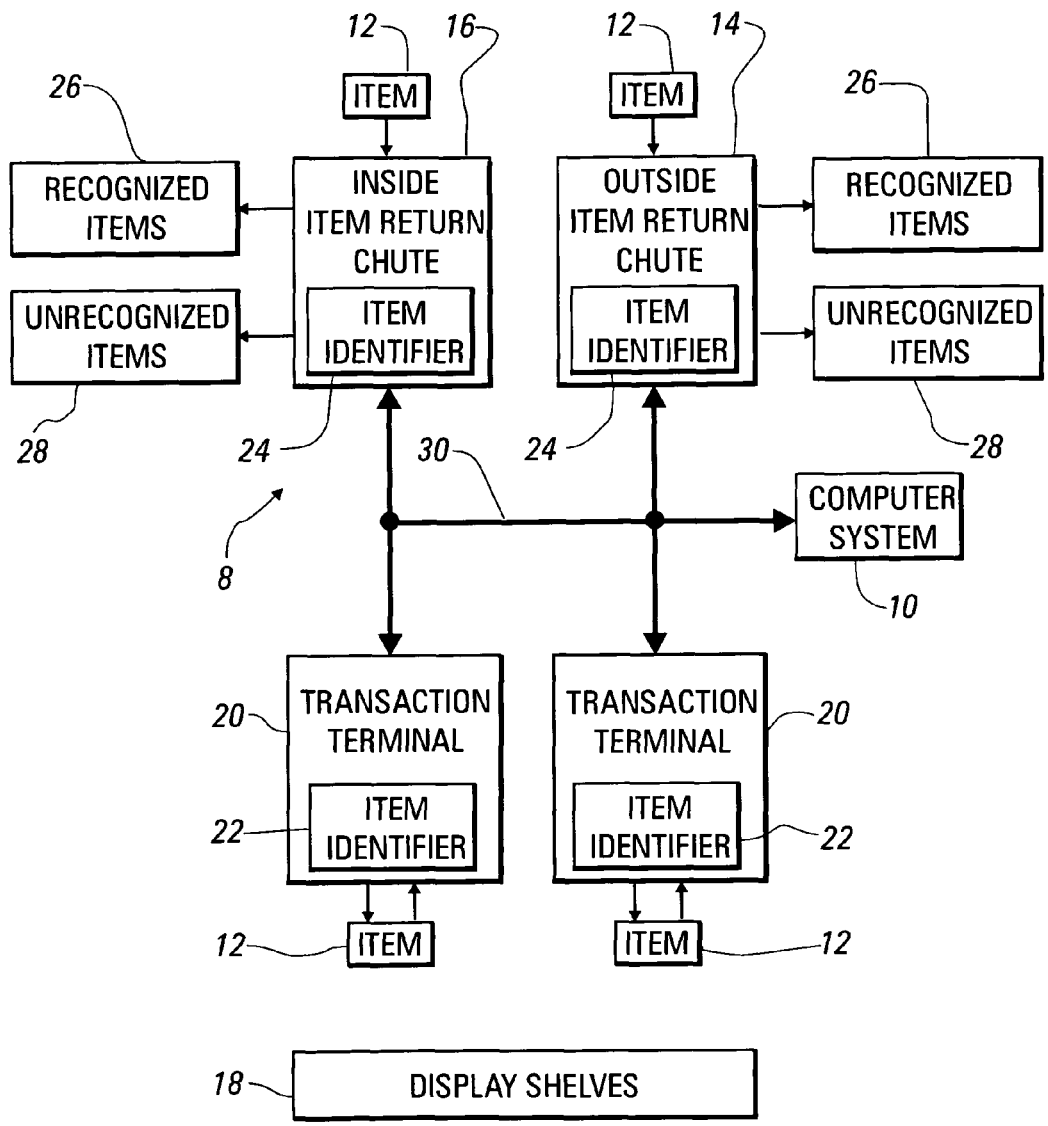
FIG. 1 is a block diagram of a store system configured in accordance with the present invention for tracking an inventory of rental or loan items as they are returned.

FIG. 1 is a block diagram of a store system 8, including a computer system 10, with the store system 8 being configured to track an inventory of items 12 as they are moved within the store and as they are returned through a outside item returning chute 14 and through an inside item returning chute 16. The items 12, which are, for example, video recordings in the form of cassettes or DVD disks in travel cases, are normally stocked on display shelves 18. When a customer selects one or more items 12 that he wishes to borrow or rent, he takes the items 12 to one of the transaction terminals 20.

Each of the items 12 includes an item identification code that is read by item identifying means 22 at each transaction terminal 20. For example, the item identification code may be a bar code printed on the travel case of a video cassette or video DVD disk. Alternately, each item 12 may include an integral radio frequency identification (RFID) transponder providing an identification code in response to a signal generated at the transaction terminal 20. In either case, the identification code includes sufficient information to identify the particular item 12 being borrowed or rented, so that it can later be determined that this particular item 12 is being returned from its identification code. For example, the identification code may include a first portion identifying its recorded content and a second portion identifying it as a particular copy of the content.

The customer returns the item 12 by depositing it in the outside item return chute 14, which can be accessed from outside the store even when the store is closed, or alternately by depositing it in the inside return chute 16, which is located inside the store. Each of the item return chutes 14, 16 additionally includes item identification means 24, which reads an identification code unique to the particular item 12 after the item 12 is placed within the item return chute 14, 16. Preferably, but not necessarily, the item identification code read by the item identification means 24 of one of the item return chutes 14, 16 is the same code, read using the same technology, as the item identification code read by the item identification means 22 within each of the transaction terminals 20.

According to one version of the invention, items 12 that are correctly recognized within either of the item return chutes 14, 16 are delivered into a storage area 26 for returned items that have been recognized, while items 12 that are not correctly recognized in this way are delivered into a storage area 26 for unrecognized items. In this way, store personnel know which items have to be checked quickly to determine, as accurately as possible, which items have been returned on time, and which items should be repaired, for example, by replacing a soiled bar code or a damaged RFID transponder, before they are returned to stock.

The item return chutes 14, 16 and the transaction terminals 20 are connected to the computer system 10 by means of a network 30, which may be a local area network (LAN), providing for the transmission of information regarding the loaning or rental and return of the items 12. A database is maintained to provide real time information regarding the location or status of individual items 12, whether they are stocked on the display shelves 18, in the possession of a customer who has loaned or rented them, or in the storage areas 26, having been recognized by item identification means 24.

FIG. 2 is a block diagram of the computer system 10 operating in accordance with the invention. The computer system 10 includes a microprocessor 34 executing program instructions stored in a read-only memory (ROM) 36 and additionally in a random-access memory (RAM) 38, both of which are connected to the microprocessor 34 through a system bus 40. The microprocessor 34 is also connected to a Peripheral Component Interconnect (PCI) bus 42 through a PCI/host bridge circuit 44.

The computer system 10 also includes data and instruction storage 46, connected to the PCI bus 42 through a storage adapter 48. For example, if the data and instruction storage 46 is a hard disk, the storage adapter 48 is a suitable hard disk adapter. Program instructions from the data and instruction storage are typically loaded into RAM 38 for execution of a program within the microprocessor 32. Data and instruction storage 46 stores instructions for the inventory control routine 49, which are loaded into the RAM 38 for execution within the microprocessor 32 in accordance with the invention. Data and instruction storage 46 also stores an item database 50 having a data record corresponding to each of the items 12, and a customer database 51 having a data record corresponding to each of the customers served by the store. In accordance with a preferred version of the invention, the data and instruction storage 46 additionally includes a needed item data structure 51a storing item codes corresponding to items 12 that are in particularly high demand, for which an alert is to be given when one of the items is returned.

User inputs to the computer system 10 are provided through a selection device including a keyboard 52 and a mouse 54, which are connected to the PCI bus 42 through a USB bus 56 and a USB bridge circuit 58. An interface to the user from the computer system 10 is provided through a display screen 60, which is attached to the PCI bus 42 through a display adapter circuit 62. The display 60, together with the selection device comprising the keyboard 52 and mouse 54, are used to provide a user interface for the computer system 10. The computer system 10 further includes a drive unit 64, accepting a computer readable medium 66 to read data therefrom. The drive unit 64 is connected to the PCI bus 42 through a drive adapter 68. For example, the computer readable medium 66 may be a compact disk or a rewritable compact disk, with the drive unit 60 being a compatible device. Preferably, the computer system 10 also includes a network adapter circuit 68, for connection to the network 30. The computer system 10 may also include a printer 72, connected to the PCI bus 42 through a printer adapter circuit 74.

The inventory control routine 49 may be installed within the computer system 10, being loaded into data and instruction storage 46, in the form of computer readable instructions embodied on the computer readable medium 66. Alternately, the inventory control routine 49 may be installed within the computer system 10 in the form of computer usable instructions embodied in a computer data signal on a carrier wave transmitted along the network 30.

FIG. 3 is a schematic view of a data record 80 within the item database 50. There is one such data record 80 for each of the items 12, with each data record 80 including a first data field 82 storing the item identifying code of the item 12, a second data field 84 storing the title of the information contained on the item 12, a third data field 86 storing data identifying the location of the item 12, and a fourth data field storing the data at which the item 12 is due back. A location code stored within the third data field 86 may have one stock location value to indicate that the item 12 associated with the data record 80 is stocked, being stored on the display shelves 18 and a recognized item code indicating that the item 12 is stored with the recognized items 26, having been returned but not yet restocked. If the item 12 has been borrowed or rented and not yet returned, a loaned item code stored within the third data record 80 includes the customer identifying code of the customer that borrowed or rented the item 12. The fourth data field 88 includes data describing a return time at which the item 2 is to be returned without incurring additional costs. If all of the items are due back at a single time of day, such as noon or midnight, the data in this field 88 may merely identify the due date, at which the item is to be returned.

FIG. 4 is a schematic view of a data record 90 within the customer database 51. There is one such data record 90 corresponding to each customer authorized to borrow or rent items 12 in the store, with each data record 90 including a first data field 82 storing a unique customer identification code assigned to the customer, a second data field 93 storing the name of the customer, a third data field 94 storing the address of the customer, a fourth data field 96 storing credit card information for the customer, and a fifth data field 98 storing an account balance for the customer.

Figure 5A:
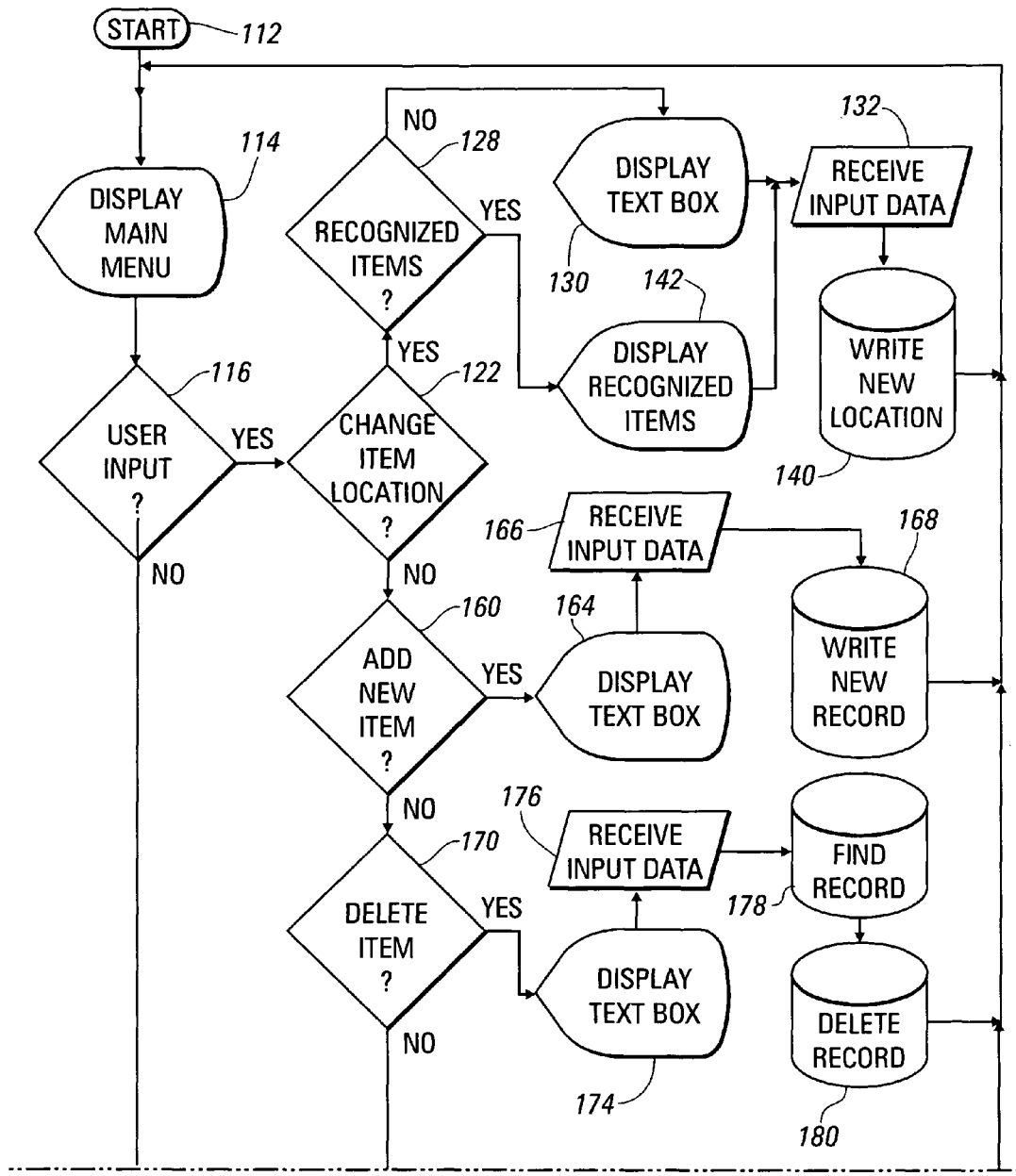
FIG. 5 is a flow chart of processes occurring within the computer system of FIG. 2 during execution of an inventory control routine, being divided into an upper portion, indicated as FIG. 5A, and a central portion, indicated as FIG. 5B, and a lower portion, indicated as FIG. 5C.
Figure 5B:
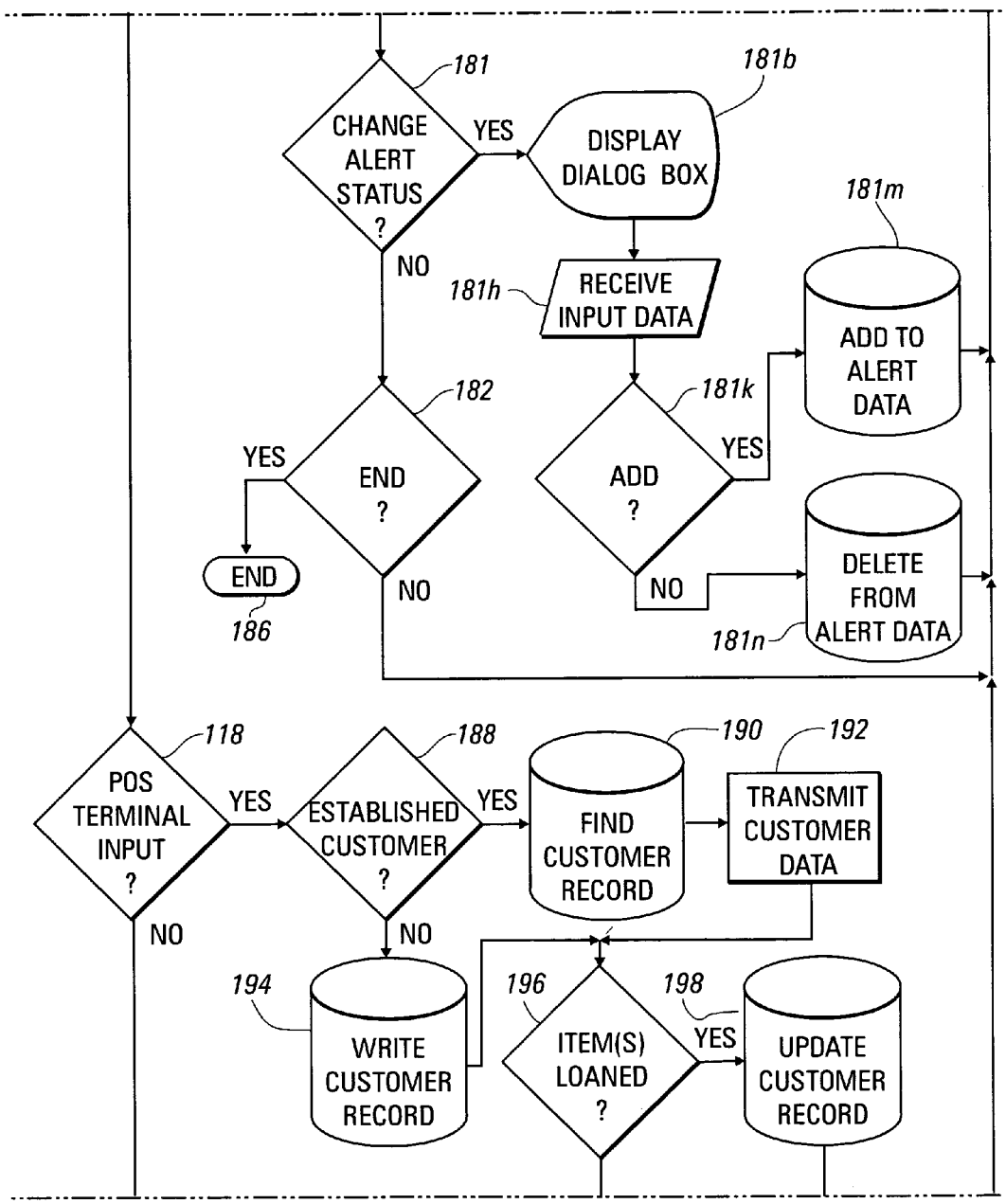
Figure 5C:
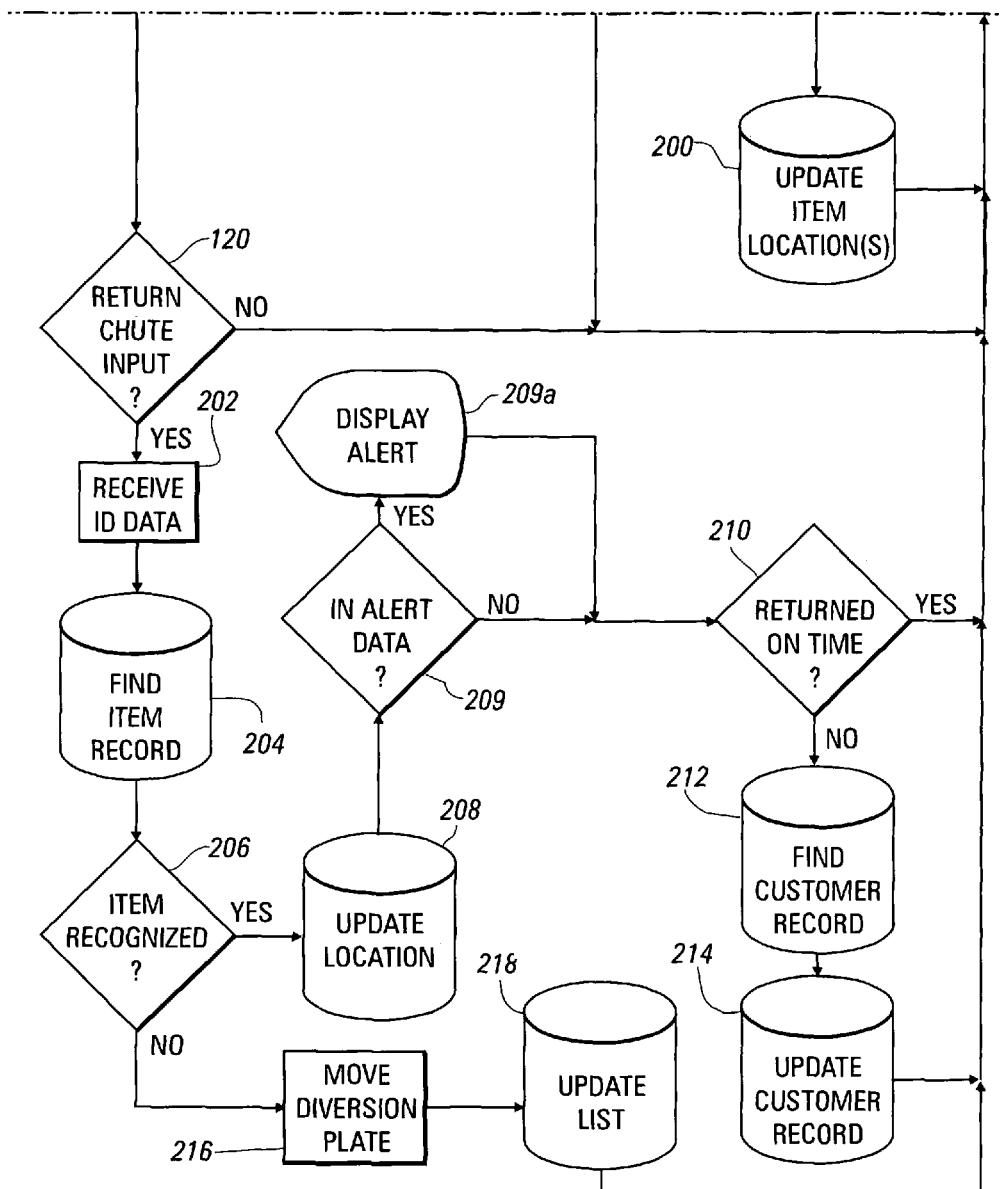
Figure 6:
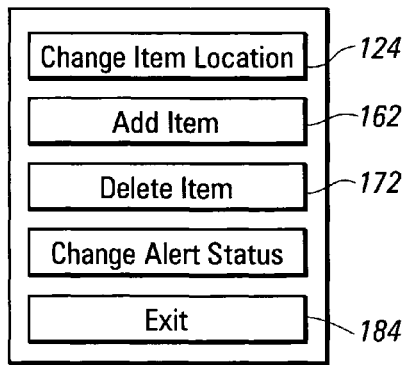
FIG. 6 shows a main menu displayed during execution of the inventory control routine processes of FIG. 5.
Figure 9:
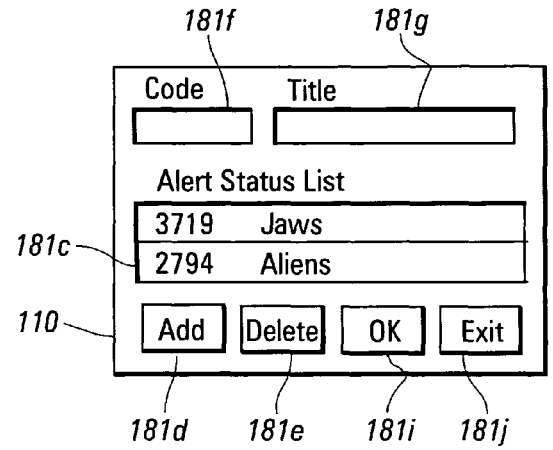
FIG. 9 shows a second dialog box displayed during execution of the inventory control routine processes of FIG. 5.
Figure 7:
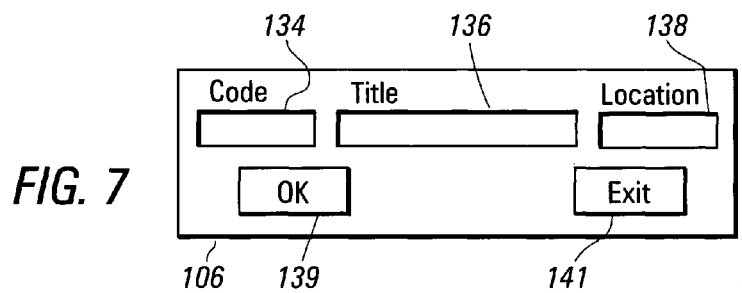
FIG. 7 shows a text box displayed during execution of the inventory control routine processes of FIG. 5.
Figure 8:
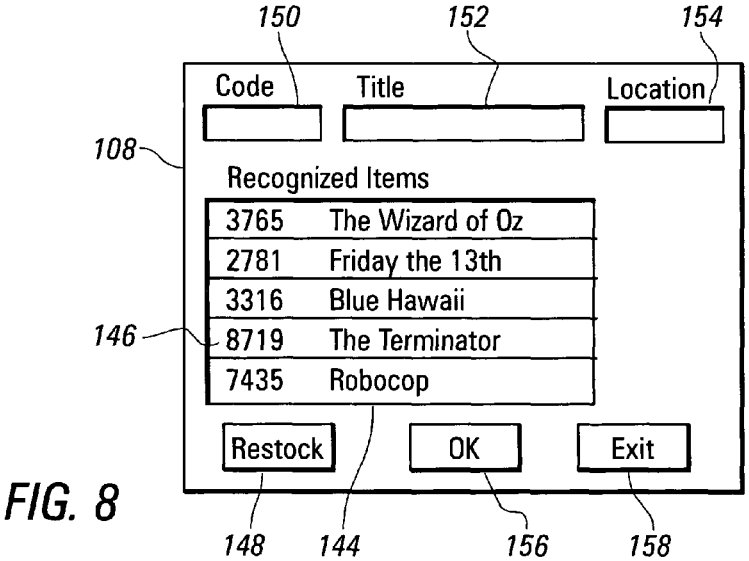
FIG. 8 shows a first dialog box displayed during execution of the inventory control routine processes of FIG. 5.

The processes of the inventory control routine 49 will now be discussed with reference being made to FIGS. 5-9. FIG. 5 is a flow chart of processes occurring within the computer system of FIG. 2 during execution of instructions within the inventory control routine 49. FIG. 5 is divided into an upper portion, indicated as FIG. 5A, a central portion, indicated as FIG. 5B, and a lower portion, indicated as FIG. 5C. FIG. 6 shows a main menu 104 displayed during execution of process steps of the inventory control routine 49. FIG. 7 shows a text box 106 also displayed during the execution of this routine 49. FIG. 8 shows a first dialog box 108 additionally displayed during the execution of this routine 49. FIG. 9 shows a second dialog box 110 also displayed during the execution of the routine 49.

After starting in step 112, the inventory control routine 49 proceeds to step 114, in which a set of menu entries, such as the main menu 104 is displayed on the display 60. At this point, the user can cause the routine 49 to perform one of several functions by selecting a command button displayed on the main menu using a selection device, such as the mouse 54, to generate a selection signal received by the routine 49. In step 116, a determination is made of whether the user has made such a selection. If he has not, the routine 49 proceeds to step 118 to determine whether an input has been received from one of the transaction terminals 20. If it has not, the routine 49 proceeds to step 120 to determine if an input has been received from one of the item return chutes 14, 16. If it has not, the routine 49 returns to step 114. Thus, the inventory control routine 49 waits to receive a user input, an input from a transaction terminal 20, or an input from an item return chute 14, 16.

When a determination is made in step 116 that a user input has been received, the inventory control routine 49 proceeds to step 122, in which a further determination is made of whether the user has selected the "Changed Item Location" button 124 of the displayed main menu 104, indicating a desire to change the location assigned to an item 12 within the item database 50, with a selection signal for changing an item location being received by the routine 49. If such a selection has been made, the routine 49 proceeds to step 126 to determine whether one or more items 12 are present in the stored recognized items 26, which have been returned and recognized but not restocked. For example, the location field 86 of each data record 80 within the item database 50 may be checked to determine if any items have location codes indicating their presence among the recognized items 26. If it is determined that there are no items 12 among the recognized items, the text box 106 is displayed in step 130, with input data being received in step 132, as the user enters data with the keyboard 52. For example, an item code may be entered in the first field 134 of the text box 106. According to one version of the invention, when a valid item code is entered in the first field 134, the system finds a corresponding data record 80 in the time database 50 and displays the title of the corresponding item 12 in the second field 136 of the text box 106, so that the user can verify that he has entered data correctly. Then the user enters a code for the location in which the item 12 is being placed in the third field 138 of the text box 106. When the user is satisfied with the data entered into the text box 106, he selects the "OK" command button 139, causing the completion of step 132, so that the routine 49 proceeds to step 140, in which a code for the new location is written to the third data field 86 of the data record 80 corresponding to the item 12. If the "Exit" command button 141 is selected instead, the text box 106 is closed without recording changing the data in the data record 80.

On the other hand, if it is determined in step 128 that there are items 12 among the recognized items 26, the dialog box 108 is displayed in step 142, with data then being received in step 132. This dialog box 108 includes a list 144 of the items 12 among the recognized items 26, which is provided to simplify the process of updating the item database 50 as items within the recognized items 26 are restocked. Each of the items 12 on the list 144 corresponds to a data record 80 including a recognized item code in third data field 86. One or more entries 146 on the list 144 may be selected with a selection device, such as the mouse 54, using conventional selection techniques, with an item selection signal being received by the routine 49, and with the subsequent selection of "Restock" command button 148 then causing the completion of the data receiving step 132, so that, in step 140, each third data field 86 of a data record 80 corresponding to a selected entry 146 being rewritten to indicate that the corresponding item 12 is being restocked on the display shelves 18.

The dialog box 108 additionally includes data fields 150, 152, 154 corresponding to the fields 134, 136, 138 of the text box 106, which are used in the same way to enter data changing the location of an item 12 not among the recognized items 26. The location of an item 12 corresponding to one of the entries 146 of the list 144 may be changed to indicate that the item 12 is not being restocked by selecting the entry 146 and by then entering a code representing the new location of the item 12 in the third data field 172 of the dialog box 108. The user indicates satisfaction with changes made using the dialog box 108 in this way by selecting the "OK" command button 156, causing the routine 49 to proceed to step 140 for writing the new information. Alternatively, the dialog box 108 is closed without writing data changes in response to the selection of the "Exit" command button 158.

If it is determined in step 122 that the "Change Item Location" command button 124 has not been selected, a further determination is made in step 160 of whether the "Add Item" command button 162 has been selected to add a data record 80 corresponding to a new item 12. If it has, the text box 106 is displayed in step 164, with data identifying the item to be added being received in step 166. The user then enters an item code representing the new item 12 in the first field 134 of the text box 106, a title for the content of the item 12 in the second field 136, and a location code indicating where the item 12 is being placed in the third field 138. When this data has been entered, the inventory control routine 49 writes a new data record 80 in step 168 for the new item 12.

If it is determined in step 160 that the "Add Item" command button 162 has not been selected, a further determination is made in step 170 of whether the "Delete Item" command button 172 has been selected. If it has, the text box 106 is displayed in step 174, with data identifying the item to be deleted being received in step 176. If the user enters an item code in the first field 134 of the text box 106, the data record 80 having the item code in its first data field 82 is found in step 178. Then, the title of the from the second data field 84 of the data record 80 is displayed in the second field 136, with the location from the third data field 86 of the data record 80 then being displayed in the third data field 138 of the text box 106. Then, if the "OK" command button 139 is selected, causing the input data step 176 to end, the record 80 is deleted in step 180. Selecting the "Exit" command button 141 instead causes the text box 106 to close without deleting the record.

In accordance with a preferred version of the invention, a method is additionally provided for determining when a needed item 12, which is in particularly high demand, has just been returned. Thus, If it is determined in step 170 that the "Delete Item" command button 172 has not been selected, a further determination is made in step 181 of whether the "Change Alert Status" command button 181a has been selected. If it has, the inventory control routine 49 proceeds to step 181b, in which the second dialog box 110, shown in FIG. 9, is displayed. The dialog box 108 includes a list 181c describing items 12 that have been identified as having alert status, so that an alarm will be displayed whenever one of these items is displayed, an "Add" command button 181d, which is selected to indicate that an item 12 is to be added to the list 181c, and a "Delete" command button 181e, which is selected to indicate that an item is to be deleted from the list 181c. The second dialog box 110 also includes a first field 181f, in which the item code for an item 12 may be entered, and a second field 181g, in which a title representing the content of the item 12 may be entered or displayed in response to entering the item code in the first field 181f.

After displaying the second dialog box 110 in step 181b, the inventory control routine 49 proceeds to step 181h, in which data is received, being provided through the use of the second dialog box 110. For example, if an item 12 is to be added, the "Add" command button 181d is selected, and the item code of the item 12 is entered using the keyboard 52 after selecting the first field 181f. If an item is to be deleted, the "Delete" command button 181c is selected, and an item to be deleted is selected from the list 181c. After the user is satisfied with his entry, the process of receiving input data in step 181h is ended by selecting the "OK" command button 181i. Alternately, the second dialog box 110 may be closed without adding or deleting an item 12 from the list 181c by selecting the "Exit" command button 181j. After step 181h, if it is determined in step 181k that an item 12 is to be added, a code representing the item 12 is added to the needed item data structure 51a, which corresponds to the list 181c in step 181m, before the routine 49 returns to step 114. Otherwise, one or more selected items 12, are deleted from this data structure 51a in step 181n. If the "Exit" command button 181j has been selected, the routine 49 returns to step 114 without adding or deleting items 12.

On the other hand, if it is determined in step 181 that the "Change Alert Status" command button 181a has not been selected, the inventory control routine 49 proceeds to step 182, in which it is further determined whether the "Exit" command button 184 has been selected. If it has, execution of instructions within the inventory control routine 49 is ended in step 186; otherwise the routine 49 returns to step 114.

The transaction terminals 20 are used for establishing new customers and for borrowing or renting the items 12 to both new and previously established customers. Thus, after the inventory control routine 49, executing within the computer system 10 determines in step 118 that an input has been received from one of the transaction terminals 20, a determination is made in step 188 of whether the customer has been previously established as a customer. For example, this determination may be based on a customer code provided within the data transmitted from the transaction terminal 20, with the customer code being read at the transaction terminal 20 from a card previously issued by the store and presented by the customer. If the customer is determined to have been previously established, the customer data record 90 from the customer database 51 is found in step 190. Then, in step 192, data concerning the customer, such as his account balance from the fifth data field 98 of the data record 90, is transmitted to the transaction terminal 20. Typically, if the customer has a balance, indicating that money is owed on a previous loan or rental, this balance is paid along with the costs of the item(s) 12 being currently loaned or rented.

On the other hand, if it is determined in step 188 that the customer has not been previously established, a new data record 90 is written in the customer database 51. The customer code placed in the first field may be generated in the in the computer system 10 so that it does not duplicate a customer code used for someone else and transmitted to the transaction terminal 20 to be printed or written on a card given to the customer. Other information, such as the customer's name, address, and credit card data, is transmitted from the transaction terminal 20 to the computer system 10 to be placed in the new customer data record 90. Then, in step 194, the new data record 90 is written to the customer database 51.

After customer data relating to a previously established customer is transmitted to the transaction terminal 20 in step 192, or after a new customer data record 90 is written in step 194, a determination is made in step 196 of whether one or more items 12 are being borrowed or rented. If they are, the customer record 90 is updated if necessary in step 198, with a change being made at least to indicate a change in the balance data stored in the fifth data field 98 if a payment has been received for this purpose. Then, in step 200, the location data in the third data field 86 of the item data record 80 corresponding to each item 12 being borrowed or rented is updated to indicate that the item 12 has been borrowed or rented. According to one version of the invention, the customer code of the customer borrowing or renting the item 12 is entered within a loaned item code as its location, with the third data field 86, with a return time, at which the item 12 is supposed to be returned without requiring additional payment, additionally being recorded in the fourth data field 88. Typically, the due date is calculated within the computing system 10 or within one of the transaction terminals 20 as a certain number of days from the present date, with the certain number of days often having two or more possible values depending on the type of item 12. A portion of the item code may be used to indicate this difference.

When it is determined in step 120 that an input signal is being received from one of the item return chutes 14, 16, information describing the item code of an item 12 deposited in the chute 14, 16 is received. Then, in step 204, the item database 50 is searched to find a data record 80 having a corresponding item code in its first data field 82. If such a data record 80 is found, as determined in step 206, indicating that the item has been successfully recognized, the location code in the third data field 86 of the data record 80 is updated in step 208 to indicate that the item 12 is placed among the recognized items 26. Then, in step 209, a further determination is made of whether the item code for the item 12 deposited in the chute 14, 16 is listed in the needed item data structure 51*a*, embodying the list 181*c* of items for which an alert is to be issued upon the return of the item. If it is, the alert is displayed in step 209*a*. Such an alert may be accompanied by an audible alarm to notify store personnel that a sought-after item has been returned, or an icon many be displayed on various computer screens throughout the store.

Then, in step 210, the due date stored in the fourth data field 88 of the data record 80 is compared with present time and date data within the computer system 10. If it is determined that the item 12 has been returned on time, the inventory control routine 49 returns to step 114. If it is determined that the item 12 has not been returned on time, data record 90 of the customer borrowing or renting the item 12 is found in step 212, by matching the customer code read from the third data field 86 of the data record 80 found in step 204. The fifth data field 98 of the customer record 90 is then updated in step 214 to indicate a balance equaling the additional payment for the returned item 12, before the inventory control routine 49 returns to step 114.

If it is determined in step 206 that the returned item 12 cannot be recognized, in accordance with one version of the invention, a signal is returned to the item return chute 14, 16 in step 216, causing a diversion plate to be moved within the chute 14, 16, so that the returned item 12 is diverted into a location storing unrecognized items 28, with a list then being updated in step 218 to track at least the number of items that have not been recognized before returning to step 114. Optionally, the time at which an unrecognized item is returned may additionally be recorded in the data structure in step 218. In this way, the item 12 is placed in a location among unrecognized items in response to a determination that there has been a failure to identify the item 12 as an item previously loaned to a customer. The list updated in step 218 may also store some information, such as a partial or complete item code for an item 12 for which a data record 80 could not be found.

Figure 10:
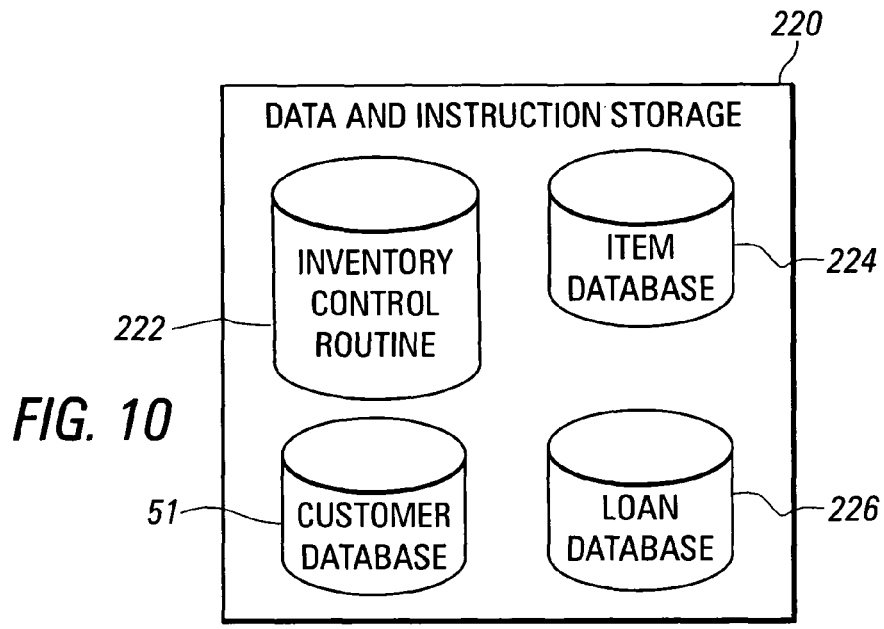
FIG. 10 is a block diagram of data and instruction storage within a computing system executing instructions in accordance with an alternative version of the invention.

An alternative version of the invention will now be discussed, with reference being made to FIGS. 10-12. FIG. 10 is a block diagram of data and instruction storage 220 within a computer system executing instructions from an alternative inventory control routine 222 in accordance with the alternative version of the invention, storing instructions for the routine 222, an item database 224, a loan database 226 and a customer database 51 similar or identical to the customer database described above in reference to FIGS. 2 and 4, and therefore accorded a like reference number.

Figure 11:
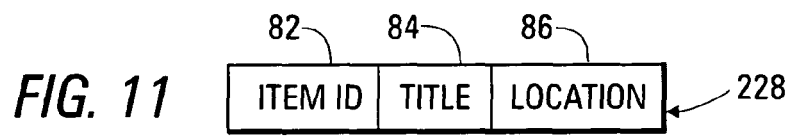
FIG. 11 is a schematic view of a data record within an item database in the data and instruction storage of FIG. 9.

FIG. 11 is a schematic view of an item data record 228, within the item database 224, having first, second, and third data fields similar to the previously discussed item data record 80, which are therefore accorded like reference numbers. The fourth data field 88, of the data record 80, which stores a data that the item 12 is to be returned, is eliminated from the item data record 228. In the alternative inventory control routine 222, certain functions of the item database 50 are carried out in the item database 224, while other functions of the item database 50 are carried out in the new loan database 226.

Figure 12:
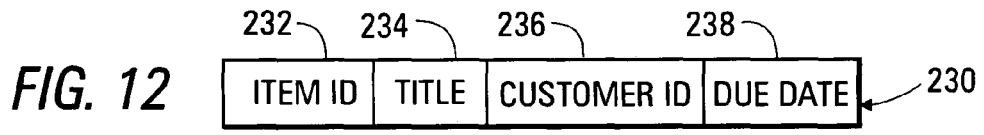
FIG. 12 is a schematic view of a data record within a loan database in the data and instruction storage of FIG. 9.

FIG. 12 is a schematic view of a loan data record 230 within the loan database 226, which includes one loan data record 230 for each item 12 that is currently on loan to a customer. The loan data record 230 includes a first data field 232 in which the item identifying code associated with the item 12 is stored, a second data field 234 in which the title of the content of the item 12 is stored, a third data field 236 in which the code identifying the customer presently borrowing or renting the item 12 is stored, and a fourth data field 238 in which the date at which the item 12 is to be returned without payment of additional fees is stored.

Process steps occurring during the execution of instructions within the alternative inventory control routine 222 are similar to the process steps described above in reference to FIG. 5, except for process steps 200, 204, and 208. Specifically, with the alternative inventory control routine 222, a new data record 230 is written within the loan database 226 in step 200 to indicate that customer having an customer code recorded in the third data field 236 has borrowed or rented an item 12 having an item code written in the first data field 232. The due data for returning the item 12 is also written in the fourth data field 238. The customer code may also be written in the location field 86 of the item data record 228, or a code merely indicating that this item 12 has been borrowed or rented may be written in this field 86, so that a search of the item database 224 will show that this item 12 is not available for another purpose.

Additionally, with the alternative inventory control routine 222, in step 204 the loan database 226 is searched to find a data record 230 having a first data field 232 storing the item identifying code stored received in step 202. Then, in step 208, this data record 230 is deleted for an item 12 determined to be recognized in step 206, with the location 86 of the item corresponding data record 228 also being updated to indicate that the item 12 is being placed with the recognized items 26 (shown in FIG. 1).

An advantage of the alternative inventory control routine 222 arises from the fact that a smaller database 226 is searched when an item is returned, as indicated by data received in step 202. The loan database 226 may be implemented in a technology providing faster access, such as memory chips instead of magnetic storage. An advantage to storing the customer identifying code in both the item database 224 and the loan database 226 is that such information is less likely to be lost in the event of a power failure or in the event of a device failure.

Figures 13, 14:
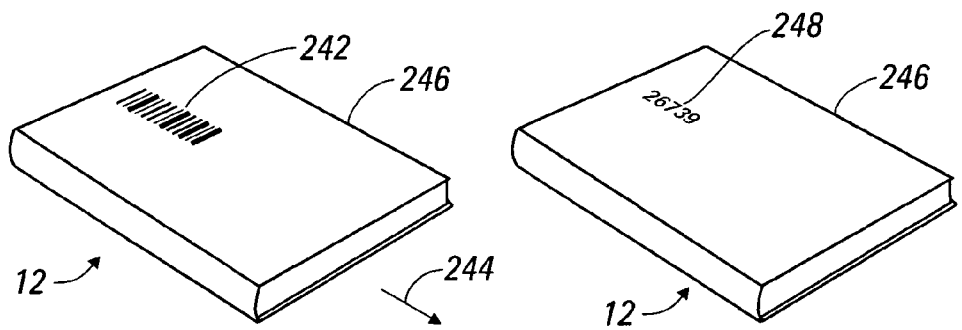
FIG. 13 is a perspective view of a first version of the loan item within the store system of FIG. 1.
FIG. 14 is a perspective view of a second version of the loan item within the store system of FIG. 1.

FIG. 13 is a perspective view of a first version of the loan item 12, shown as a travel case 240 enclosing a video recording (not shown), and having a visible barcode pattern 242 representing the item code of the item 12 printed on a side of the case 240. The barcode pattern 242 is preferably centered in a direction perpendicular to a direction, indicated by arrow 244, in which the item 12 will move through a slot within the item return chute 14, 16, so that the barcode pattern 242 can be read by a sensor located centrally within the slot regardless of the direction in which the item 12 is inserted within the slot. Preferably, a second barcode pattern (not shown), representing the same code, is placed in a corresponding position on the opposite side of the case 240, so that the two barcode patterns are similarly placed as the case 240 moves through an item return chute 14, 16 in the direction of arrow 244. In this way, one of the barcode patterns is read by a single sensor at one side of the case 240, regardless of the orientation in which it is placed within the item return chute 14, 16.

FIG. 14 is a perspective view of a first version of the loan item 12, shown as a travel case 246 enclosing a video recording (not shown), and having alphanumeric characters 248 forming a visible pattern representing the item code of the item 12 printed on a side of the case 240. Preferably, a group of alphanumeric characters (not shown), representing the same code, is placed in a corresponding position on the opposite side of the case 240, again allowing the pattern to be read by a single sensor, regardless of the orientation in which it is placed within the item return chute 14, 16.

Figure 15:
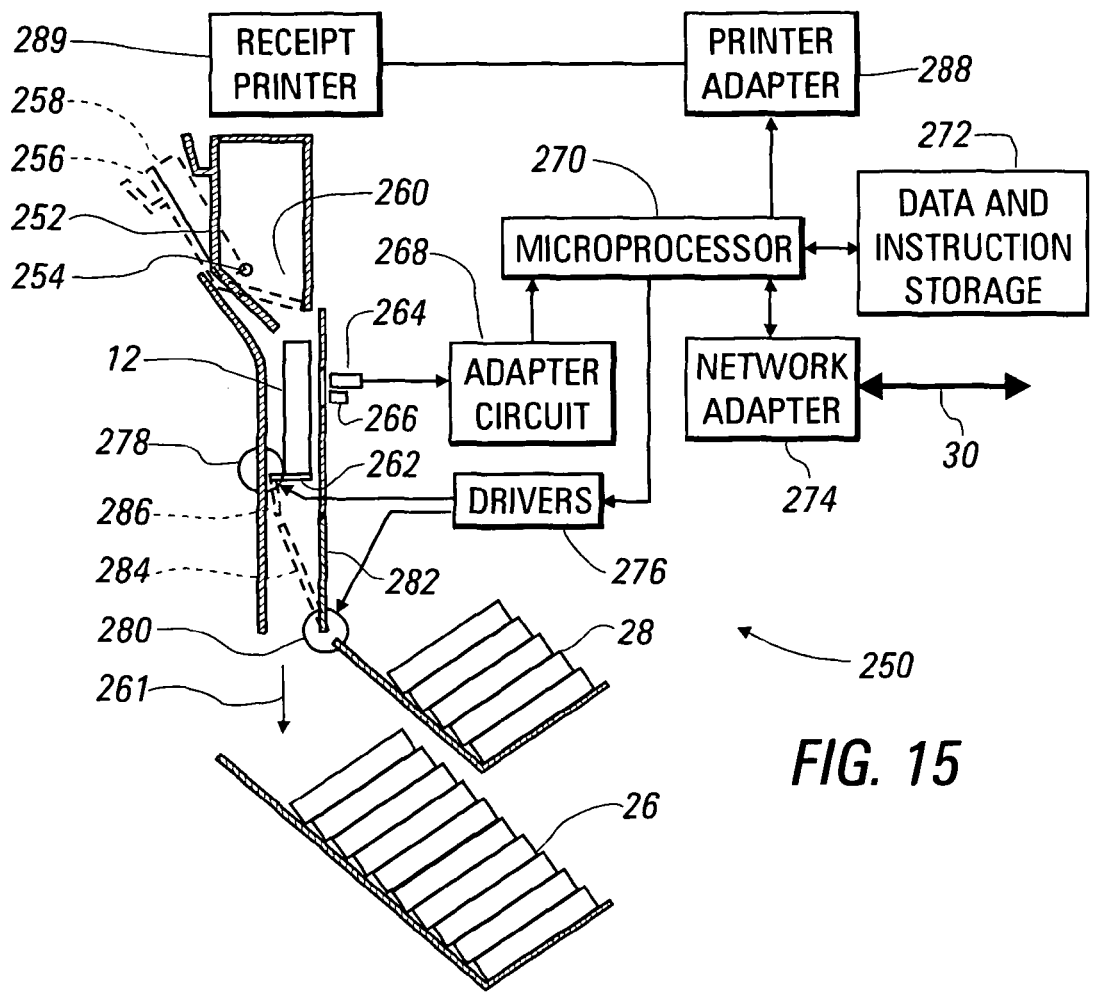
FIG. 15 is a partly schematic cross-sectional view of a first version of an item return chute in the store system of FIG. 1.

FIG. 15 is a partly schematic cross-sectional elevation of a first version 250 of the item return chute 14, 16. This first chute version 250 includes an access door 252, pivotally mounted at a hinge point 254, which is manually pulled open into the position indicated by dashed lines 256, so that the item 12 can be placed in the position indicated by dashed lines 258. When the access door 252 is then released, it returns to the position in which it is shown, so that the item 12 drops through a gap 260 into the position in which it is shown. A process for reading an identification code is started by opening and closing the door 252, operating a switch (not shown) to sense door movement. The downward movement, in the direction of arrow 261, of the item 12 is then stopped by a gate 262, with the item 12 remaining within a position in which a visible pattern, such as the barcode 242 or the alphanumeric characters 248, is read using a sensor 264, with illumination being provided by a light source 266.

In a manner well known to those skilled in the art of designing equipment for reading barcode patterns, the light source 266 may include a laser beam deflected by a rotating mirror to move in a pattern causing a photomultiplier within the sensor 264 to produce an output signal modulated by the barcode pattern.

Alternatively, the light source 256 may be arranged to light an area covering the visible information to be read, in the form of the barcode 242 or the alphanumeric characters 248, with the sensor 264 including a CCD (charge coupled device) producing an output signal in the form of pixels corresponding to light and dark areas of the visible information. In a well known manner, such an output signal can be decoded to determine the barcode pattern or which symbols arte present within the alphanumeric characters 248.

The output of the sensor 264 is provided as an input to an adapter circuit 268, which is connected to a microprocessor 270 executing a program from instructions stored within data and instruction storage 272. The microprocessor 270 is also connected to a network adapter circuit 274, providing for communications with the computer system 10 over the network 30. The microprocessor 270 is further connected to driver circuits 276, which drive a first solenoid 278 and a second solenoid 280 in response to output signals from the microprocessor 270.

Preferably, the program executed within the microprocessor 270 derives an alphanumeric code from the output of the sensor 264. This code is then transmitted to the computer system 10 over the network 30, being received as item identification data in step 202, as explained above in reference to FIG. 5. If it is determined within the computer system 10 in step 206 that the item code does not match an item code of an item that has been borrowed or rented, a signal is transmitted from the computer 10 to the first version 250 of the item return chute causing the microprocessor 270 to actuate the solenoid 280 so that a diversion plate 282 is moved from the position in which it is shown to a position indicated by dashed lines 284. Then, the solenoid 278 is actuated, moving the gate 262 from the position in which it is shown into the position indicated by dashed lines 286, so that the item 12 moves downward, along the diversion plate as indicated by dashed lines 286, into the stack of unrecognized items 28.

On the other hand, if it is determined in step 206 that the item code transmitted from the first version 250 of the item return chute matches an item code for an item that has been borrowed or rented, a signal is transmitted from the computer 10 to the item return chute 250, causing the microprocessor 270 to actuate the solenoid 278 moving the gate 262 to release the item 12 to move downward in the direction of arrow 261 without being diverted into the unrecognized items 28. In this way, the item 12 is placed among the recognized items 26.

According to one version of the invention, the microprocessor 270 is additionally connected to a printer adapter 288 to drive a receipt printer 289. Thus, after an item has been identified, the receipt printer 289 prints a receipt indicating that the particular item, identified by item code and/or title, has been returned at a particular time of day. Such a receipt may be valued by the customer, who does not need to be concerned about getting credit for returning the item 12 at a particular time.

Figure 16:
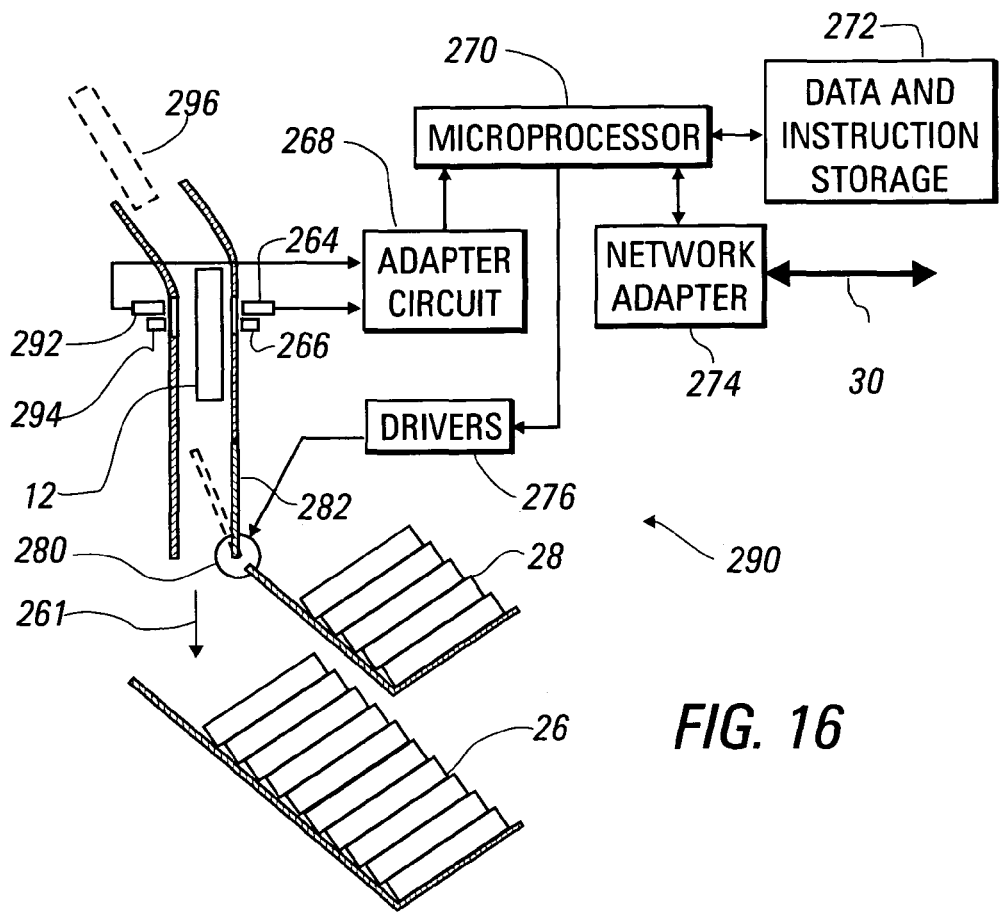
FIG. 16 is a partly schematic cross-sectional view of a second version of an item return chute in the store system of FIG. 1.

FIG. 16 is a partly schematic cross-sectional elevation of a second version 290 of the item return chute 14,16. Various aspects of this second chute version 290 are similar to aspects of the first chute version 250, and are therefore accorded like reference numbers. In the second chute version 290, a second sensor 292, connected to the adapter circuit 268, and a second light source 294 are added so that the barcode pattern 242 or the alphanumeric character pattern 248 identifying an item 12 can be read, even if it is only placed on one side of the item 12. The access door 252 of the first chute version 250 is eliminated, with the process of reading an item identification code beginning with sensing the presence of an item 12 adjacent one of the sensors 264, 292. The item 12 is dropped into the chute from a position indicated by dashed lines 296. If the identification code cannot be read, the solenoid 280 is actuated so that the item 12 is diverted into the unrecognized items 28. If the identification code can be read, the item 12 is dropped into the recognized items 26.

Figure 17:
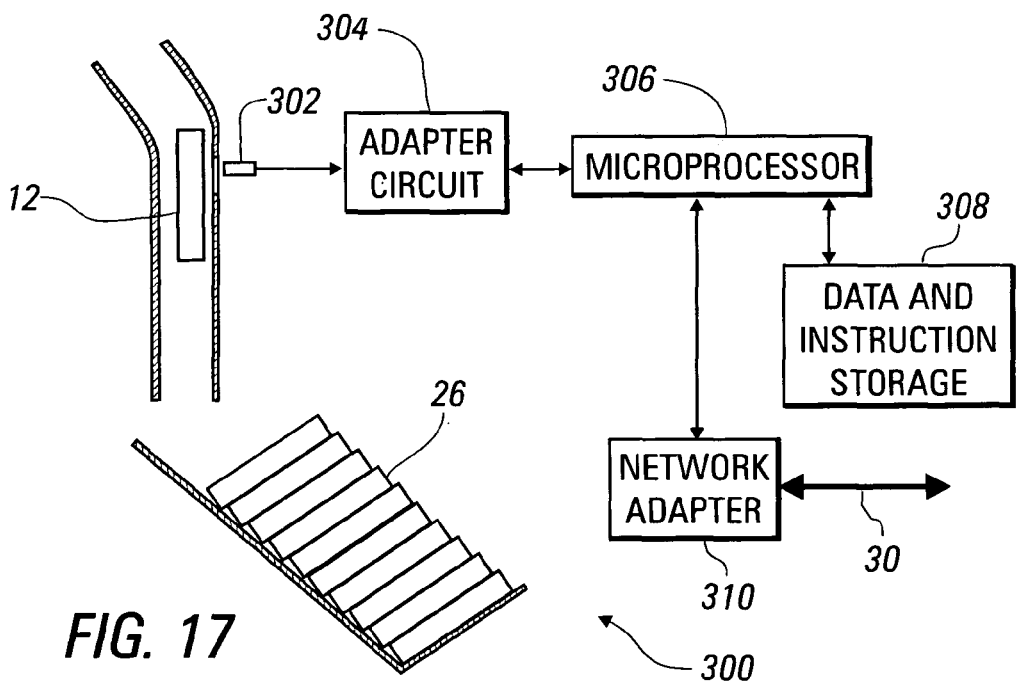
FIG. 17 is a partly schematic cross-sectional view of a third version of an item return chute in the store system of FIG. 1.

FIG. 17 is a partly schematic cross-sectional elevation of a third version 300 of the item return chute 14, 16, which is configured to identify an item 12 including an RFID transponder (not shown). The system includes a transceiver 302 transmitting an interrogation signal causing the RFID transponder to respond with a radio frequency embodying the item identifying code of the item 12. A signal from the transceiver 302 is also provided as an input to an adapter circuit 304, which transmits data identifying the item 12 to a microprocessor 306, executing instructions stored within data instruction storage 308. The microprocessor 306 is also connected to the network 30 through a network adapter 310. In the example of FIG. 17, separate storage for unrecognized items 28 is eliminated, with the third item return chute version 300 merely transmitting item codes as they are recognized.

It is understood that various features of versions 250, 290, 300 of the return chute may be combined. For example, a transceiver may be used instead of an optical sensor in a device that is otherwise similar to the first version 250. It is further understood that, while the preferred versions of the invention have been described with some degree of particularity, that description has only been given by way of example, and many changes may be made without departing from the spirit and scope of the invention, as described in the appended claims.

What is claimed is:

1. A method for tracking a plurality of items as items within the plurality of items are loaned to customers, wherein the method comprises:
   maintaining an item database accessed by a store computer system and including an item data record corresponding to each item in the plurality of items;
   storing a loaned item code in the item data record corresponding to an item in the plurality of items as the item is loaned to a customer;
   identifying the item as the item is returned through an item return chute accessible to the customer;
   storing a recognized item code in the item data record corresponding to the item in response to identifying the item as the item is returned through the item return chute; and
   storing a stock location code in the item data record corresponding to the item when the item is returned to a stock location.

2. The method of claim 1, additionally comprising:
   maintaining a customer database, additionally accessed by the store computer system, and including a customer data record corresponding to each customer to which an item in the plurality of items is loaned;
   updating a data record to indicate that the item has been loaned to the customer;
   updating a data record to indicate a return time at which the item is to be returned;
   determining, within the store computer system, whether the item is returned through the return chute after the return time; and
   writing, from the store computer system, data indicating a late fee to the customer data record in response to determining that the item is returned after the return time.

3. The method of claim 2, wherein a customer code identifying the customer to which an item is loaned and data indicating the return time is written from the store computer system to the item data record corresponding to the item.

4. The method of claim 3, additionally comprising
   maintaining a loan database accessed by the store computer system and including a data record for each item on loan to a customer; and
   writing from the store computer system a customer code identifying the customer to which an item is loaned and data indicating the return time to the data record for an item within the loan data base; and
   removing the data record for the item on loan from the loan database in response to identifying the item as the item is returned through the item return chute.

5. The method of claim 2, additionally comprising
   storing an item in a first location in response to identifying the item as the item is returned through the item return chute; and
   storing an item in a second location, separate from the first location, in response to failing to identify the item as the item is returned through the item return chute, wherein a diversion plate is moved to a first position so that the item is stored in the first location and to a second position so that the item is stored in the second location.

6. The method of claim 2, additionally comprising
   storing an item in a first location in response to identifying the item as an item loaned to a customer as the item is returned through the item return chute; and
   storing an item in a second location, separate from the first location, in response to failing to identify the item as an item loaned to a customer as the item is returned through the item return chute, wherein a diversion plate is moved to a first position so that the item is stored in the first location and to a second position so that the item is stored in the second location.

7. The method of claim 1, additionally comprising
   storing an item in a first location in response to identifying the item as the item is returned through the item return chute; and
   storing an item in a second location, separate from the first location, in response to failing to identify the item as the item is returned through the item return chute, wherein a diversion plate is moved to a first position so that the item is stored in the first location and to a second position so that the item is stored in the second location.

8. The method of claim 7, additionally comprising recording time data within a receipt printer indicating a time an item is returned in response to failing to identify the item as the item is returned though the item return chute.

9. The method of claim 1, additionally comprising
   storing an item in a first location in response to identifying the item, within the store computer system, as an item loaned to a customer as the item is returned through the item return chute; and
   storing an item in a second location, separate from the first location, in response to failing to identify, within the store computer system, the item as an item loaned to a customer as the item is returned through the item return chute.

10. The method of claim 1, wherein the item is identified, within the store computer system, by a code generated from a visible pattern on a surface of the item.

11. The method of claim 1, wherein the item is identified, within the store computer system, by a code embodied within a radio frequency signal transmitted from the item.

12. The method of claim 1, additionally comprising:
   maintaining a needed item data structure, accessible to the store computer system, including a code representing at least one needed item, which is in particularly high demand, within the plurality of items for which an alert is to be given when the item is returned;
   identifying, within the store computer system, the needed item as the needed item is returned through the item return chute; and displaying an indication that the needed item has been returned.

13. A system for tracking a plurality of items as items within the plurality of items are loaned to customers, wherein the system comprises:
   data storage storing a first database including an item data record corresponding to each item in the plurality of items loaned to customers;
   an item return chute, accessible to the customers, generating a returned item identifying code when an item in the plurality of items is returned through the item return chute;
   a user interface including a display and a selection device;
   processor means programmed to perform steps of:
      receiving the returned item identifying code;
      in response to receiving the returned item identifying code, updating an item data record having an item identification code corresponding to the returned item identifying code to include a recognized item code indicating the item corresponding to the data record has been recognized;
      displaying a set of menu entries on the display;
      receiving a menu selection signal for changing an item location from the selection device;
      in response to receiving the menu selection signal for changing an item location from the selection device, displaying a list of items corresponding to data records including the recognized item code on the display;
      receiving an item selection signal from the selection device indicating a choice of a selected item from the list of items; and
      in response to receiving the item selection signal, updating a data record stored in the data storage to indicate the selected item has been moved to a stock location.

14. The system of claim 13, wherein
   the data storage additionally stores a customer database including a customer data record corresponding to each customer to which an item in the plurality of items has been loaned,
   each item data record in the first database having an item identification code corresponding to an item loaned to a customer includes data identifying the customer and data identifying a time by which the item is to be returned, and
   the processor means is additionally programmed to perform steps of:
      determining, in response to receiving the returned item identification code, whether the item has been returned on time by comparing a current time with the data identifying a time by which the item is to be returned; and
      in response to determining that the item has not been returned on time, adding data to a customer data record corresponding to the customer indicating that an additional payment is charged.

15. The system of claim 14, wherein
   the system additionally comprises a transaction terminal generating loan data, when an item is loaned to a customer, including a loaned item identification code corresponding to the item and a customer identification code corresponding to the customer,
   the first database includes an item data record corresponding to each item in the plurality of items, and
   the processor means is additionally programmed to perform steps of:
      receiving the loan data; and
      in response to receiving the loan data, updating an item data record in the first database corresponding to the item to include data indicating the item is loaned to the customer.

16. The system of claim 14, wherein
   the system additionally comprises a transaction terminal generating loan data, when an item is loaned to a customer, including a loaned item identification code corresponding to the item and a customer identification code corresponding to the customer,
   the data storage additionally stores an item database including an item data record corresponding to each item in the plurality of items, and
   the processor means is additionally programmed to perform steps of:
      receiving the loan data;
      in response to receiving the loan data, adding an item data record to the first database corresponding to the item, including a customer identification code corresponding to the customer; and
      in response to receiving the returned item identifying code, removing an item data record from the first database including an item identifying code corresponding to the returned item identifying code.

17. The system of claim 13, wherein the processor means is additionally programmed to perform steps of:
   receiving a menu selection signal for adding an item from the selection device;
   in response to receiving the menu selection signal for adding an item, receiving data identifying the item to be added and adding an item data record to a database including the data identifying the item to be added;
   receiving a menu selection signal for deleting an item from the selection device; and
   in response to receiving the menu selection signal for deleting an item, receiving data identifying the item to be deleted and deleting an item data record from a database including the data identifying the item to be deleted.

18. The system of claim 13, wherein
   the item return chute includes a deflection plate controlling movement of the items through the return chute
   the deflection plate is moved into a first position, causing an item to be moved into a group of recognized items, in response to reading a code identifying the item; and
   the deflection plate is moved into a second position, causing an item to be moved into a group of unrecognized items, in response to failing to read a code identifying the item.

19. The system of claim 13, wherein
   the item return chute includes a deflection plate controlling movement of the items through the return chute,
   the processor means is additionally programmed to perform, in response to receiving the returned item identifying code, returning a signal to the item return chute indicating whether the first database includes an item record having an item identifying code corresponding to the returned item identifying code, indicating the item is among the plurality of items loaned to customers;
   the deflection plate is moved into a first position, causing an item to be moved into a group of recognized items, in response to reading a code identifying the item and finding the item identified by the code among the plurality of items loaned to customers,
   the deflection plate is moved into a second position, causing an item to be moved into a group of unrecognized items, in response to failing to read a code identifying the item and additionally in response to failing to find the item identified by reading a code identifying the item among the plurality of items loaned to customers.

20. The system of claim 13, wherein the item is identified by a code generated from a visible pattern on a surface of the item.

21. The system of claim 13, wherein the item is identified by a code embodied within a radio frequency signal transmitted from the item.

22. The system of claim 13, wherein the processor means is additionally programmed to perform steps of:
- receiving a menu selection signal for adding a needed item, which is in particularly high demand, to a list of needed items for which an alert is to be given when the needed item is returned;
- in response to receiving the menu selection signal for adding a needed item to the list of needed items, adding a code representing the item to a needed item data structure;
- receiving a menu selection signal for deleting a needed item from the list of needed items;
- in response to receiving the menu selection signal for deleting the needed item form the list of needed items, deleting a code representing the needed item from the needed item data structure;
- in response to receiving the returned item identifying code, determining whether the returned item identifying code corresponds to a code stored in the needed item data structure, and
- in response to determining that the returned item identifying code corresponds to a code stored in the needed item data structure, displaying an alert message.

\* \* \* \* \*